July 16, 1957 H. JUST 2,799,565
PROCESS FOR PREVENTING OR REDUCING THE ENTRAINMENT OF FINE
SOLID PARTICLES IN THE GAS STREAM OF A GAS PRODUCER
Filed Jan. 6, 1954
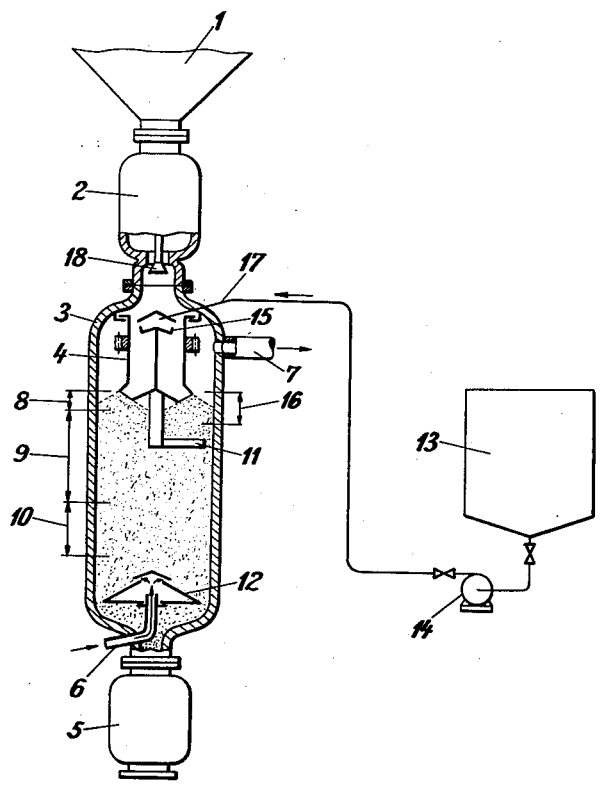
INVENTOR
HANS JUST
By Ostrolenk, Faber,
Gerb & Soffen
ATTORNEYS United States Patent Office 2,799,565
Patented July 16, 1957

2,799,565

PROCESS FOR PREVENTING OR REDUCING THE ENTRAINMENT OF FINE SOLID PARTICLES IN THE GAS STREAM OF A GAS PRODUCER

Hans Just, Essen, Germany, assignor to Ruhrgas Aktiengesellschaft, Essen, Germany Application January 6, 1954, Serial No. 402,424

Claims priority, application Germany January 13, 1953

5 Claims. (Cl. 48—203)

This invention relates to shaft gas producers, i. e. to gas producers comprising an upright shaft into which fuel is introduced at its upper end and to which a blast, for example, of air or steam, is supplied at its lower end. It relates particularly, but not exclusively, to pressure shaft gas producers in which gasification of the fuel takes place under high pressure.

In a shaft gas producer the fuel descending in the shaft passes in sequence through the following zones:

(a) A preheating or drying zone, in which the fuel is preheated and freed from moisture by the gas ascending in the shaft.

(b) A devolatilization or distillation zone, in which the fuel is heated sufficiently for volatile matter in the coal to distil off. Non-bituminous fuels, e. g. small coke or breeze, or fuels containing no volatile matter pass unchanged through this zone.

(c) A gasification zone, in which the fuel is heated to the temperature required for reaction with the blast. This zone is often divided into two sections in the lower of which the fuel is partly burnt to form $CO_2$ and in the upper of which the $CO_2$ is reduced to CO.

When the coal used as the fuel softens when heated and tends to cake while the volatile constituents are distilled off, a stirring device is used to prevent caking of the coal and a rotating grate is often provided to prevent the formation of large pieces of slag.

The output of a shaft gas producer is limited by that rate of flow of gas at which the finer constituents of the fuel are entrained by the gas stream to such an extent that the rapid fouling of the gas pipes and apparatus connected to the gas producer renders impossible or uneconomical an ordered operation of the gas producer. This limitation of the output of the gas producer is particularly disadvantageous when fine grained, easily friable fuels, or fuels which decompose easily during gasification, are used.

In the gasification of caking coals the stirring device causes an increased formation of dust which is carried away by the gas stream even when a fuel of small dust content is used. A rotating grate too causes an increased formation of dust which is also carried away by the gas stream. The output of coal-using shaft gas producers per square metre of shaft cross section is therefore substantially less than that of a normal gas producer fired with coke of the same lump size. Despite its reduced output, a shaft gas producer using coal fitted with a stirrer produces a gas of relatively high dust content and a tar much contaminated with dust and unsuitable for working up. This disadvantage naturally applies particularly to low shaft furnaces charged with coal and ore or with coal-ore briquettes and operated with a high speed blast, since the purification of the gas laden with coke-and-ore-dust as well as with tar presents serious difficulties.

An object of the invention is to provide a method for avoiding or reducing the entrainment of fine dust particles in the gas stream of a shaft gas producer.

A further object of the invention is to provide a method of increasing the output i. e. the rate of gasification in a shaft gas producer.

These and other objects and advantages of the invention will be evident from the following detailed description.

I have discovered that, even at a high gasification output, the dust contained in the charge or formed by agitation of caking fuels can be largely retained in the shaft gas producer if the charge is mixed, before introduction into the gas producer or within the gas producer before it reaches the gasification zone, with a moistening agent containing hydrocarbon-containing compounds to produce in the shaft of the furnace, above the gasification zone, a filtering layer extending over the whole cross-sectional area of the shaft and of sufficient depth to constitute an effective filter for the dust.

The expression "moistening agent" used herein means a hydrocarbon-containing compound having an initial boiling point exceeding the temperature prevailing in the filtering layer and such as will form in the filtering layer a thin liquid film over each particle of fuel in the filtering layer. Such suitable moistening agents for instance are tar, oil residues, residues of hydrogenation of liquid and solid fuels, pitch or the like, or mixtures of these substances.

The moistening agent may be added to the charge either outside the gas producer, i. e. in combination with a hopper and feeding device of known construction by means of sprayers or other known means, or within the gas producer at a point where the charge has a temperature which is lower than the boiling or distillation temperature of the lowest boiling components of the moistening agent, i. e. preferably below 100° C.

The filtering layer must be formed at a level in the shaft at which the temperature is not so high that the moistening agent is distilled off immediately. Preferably the filtering layer is formed in the pre-heating zone, but it may in suitable cases be formed in the distillation zone.

It is important that the addition of the moistening agent should take place at a stage such that the fuel has a sufficiently low temperature to ensure that no immediate distillation of the moistening agent occurs but that this is spread over the charge in a liquid state in such a manner that a moistened layer of fuel is formed which can operate like an oil-wetted dust filter. This layer must extend over the whole cross-sectional area of the shaft as otherwise part of the gas will escape unfiltered. Particularly suitable as moistening agents are high boiling products. It has also been found that a relatively high dust content in the moistening agents themselves is immaterial as this dust is bound by the liquid phase and does not pass into the gas.

For the filtering layer to be effective it must have a certain minimum depth. As the fuel travels down moistening agent is continuously distilled off in the gasification zone. If, therefore, too small a quantity of moistening agent is used, it distils too rapidly, or due to its partial pressure, is stripped away as vapour by the large quantities of gas passing by.

A layer of moistened fuel of the required depth cannot then be formed and its effect is considerably reduced. It has been found that this disadvantageous phenomenon can be avoided by suiting the quantity of added moistening agents to the loading of the gas producer, i. e., the more moistening agent must be used, the higher is the output required from the gas producer. While with a normal output from a gas producer charged with fine grained coal, an addition of 5% of the charge weight of well distributed moistening agent is sufficient substantially completely to prevent entrainment of dust by the gas stream, the output of the gas producer can be raised by 50% with corresponding freedom of the gas from dust, if the addition of moistening agent is increased to 10% of the charge weight. As the temperature of the moistening agent will not be essentially higher than the temperature of the fuel on which it is spread, the depth of the filter layer ranges down to the zone at which the temperature of the fuel has been raised up to the temperature at which according to the respective composition of the moistening agent wet residues capable to be distilled or cracked are still prevailing. In the case of a moistening agent containing tar or pitch this temperature will be about 500° C.

For example I used a moistening agent, the data of which were the following: H₂O, 2.1% (of weight); spec. gravity (20° C.), 1.054 grams/cm.³.

Analysis (M. A. F.): Percent
H ---------------------------------- 8.19
C ---------------------------------- 85.70
S ---------------------------------- 0.48
N ---------------------------------- 0.92
O ---------------------------------- 4.71

Boiling range:
5% till 151.5° C.
10% till 196.5° C.
50% till 344.5° C.
57% till 360° C.
43% residue, partly crackable This is only one example of a suitable moistening agent.

It can happen with bituminous fuels that the quantity of tar produced from the quantity of fuel introduced per unit of time is smaller than that required for moistening this amount of fuel. In this case a multiple of the amount of tar or tar fractions produced from the coal is used for moistening. Of the quantity of moistening agent added, the major part is recovered as distillate in the condenser associated with the gas producer and can be recirculated to the gas producer. Because, as already mentioned, dust covered with the moistening agent is bound to the coal and does not reappear in the exit gas, it is possible to use for return from the condenser to the gas producer tar which is enriched with dust, which it has collected by settling or otherwise, while the product taken from the circuit is always free from dust and available for sale or for working up.

The invention is not limited in its application to bituminous fuels, on gasification of which the tar serving as the moistening agent is produced continuously, but the process may also be applied with advantage to non-bituminous fuels, e. g., small coke or breeze. In this case, for example, it is possible to use as a circulating moistening agent oil residues arising from the refining of mineral oil.

It has also been found that the low temperature of the uppermost layers of fuel in a gas producer, which is necessary for the action of the moistening agent, can be obtained by using for moistening certain water-containing oily moistening agents, e. g., water-in-oil or water-in-tar emulsions. The water content is preferably chosen higher with increase in the exit temperature of the gases. A high moisture content of the fuel itself is injurious, as it makes the coal incapable of being satisfactorily moistened. The required depth of the dust-filtering fuel layer must, in case of need, be created by increasing the depth of the charge in the gas producer.

The process according to the invention has proved of special importance for increasing the output of gas producers which are operated under an increased pressure. The increased density of the gas, caused by the increased pressure, gives the finer dust particles a greater buoyancy and so leads to higher entrainment of such particles by the gas stream. The dust-enriched quantities of tar which are set free therefore deposit themselves as a sticky mass in the passages available for the gas. As, due to the increased pressure, the areas of these passages are reduced, the deposited sticky masses seriously endanger the safety of operation of the plant. Also, the quality of the deposited tar is materially influenced by the dust content especially as such tars easily form with the aqueous condensate emulsions which are difficult to break. In these cases the process according to the invention leads to increases in output of the pressure gas producers of far over 50%. In this case also, the amount of moistening agents to be added is dependent upon the increase in output.

The addition of the moistening agent also has a beneficial effect on the quantity of the tar obtained. Due to the even distribution of the moistening agent on the upper layer of fuel in the gas producer, decomposition of the tar is largely avoided. The gas stream rising from the gasification zone effects, on the contrary, an almost residue-free protective distillation of the moistening agent above the distillation zone. Into the latter pass, therefore, in the main, only certain pitch constituents of the moistening agent which are there transformed again into liquid decomposition products and only to a small extent into gaseous decomposition products. Under the conditions of increased pressure, this reaction leads mainly to liquid products.

It has further been found that the formation of a dust-filtering boundary layer by addition of moistening agents is a convenient way of adding catalysts to the fuel and so influencing the course of the distillation and gasification operations. Thus, for example, an addition of alkali compounds, alkalized iron catalysts or alkalized iron-containing fuel ash serves to increase the methane content of the gas or to attain more rapidly equilibrium during gasification. Such additions of catalysts, particularly when solid, have always had the disadvantage that they are entrained by the gas stream and so withdrawn, in part at least, from the scene of operations in the gas producer. Also, they have fouled the condensation products, so that costs additional to the cost of the additions have been involved in removing them from the condensation products.

When, however, such catalysts are incorporated in either the aqueous or oil phase of the oily moistening agents, they are so bound to the fuel that entrainment of them by the gas is almost impossible. Due to the even distribution and binding to the surface of the fuel, far less additions are required so that their effect is enhanced. In particular, in pressure gas producers a considerable increase in calorific value of the gases can be obtained.

The enclosed drawing shows a diagrammatic view of an example of a gas producer suitable for carrying out the method according to the invention and operating under increased pressure.

The coal is introduced from a fuel hopper 1, through a fuel feeding device 2, into the upper end of shaft 3 of the pressure shaft gas producer, and distributed by a rotating fuel distributor 4 on the cross-section of the shaft 3. The ash is removed through a de-ashing device 5 at the bottom of shaft 3.

Fuel feeding device 2 and de-ashing device 5 are supplied with one valve each at the inlet and outlet ends, which are opened alternately in order that, when the coal is filled into the shaft 3, which is under pressure, and when ash is taken out of the shaft, the pressure is being maintained. The drawings show as an example the valve 18 at the discharge end of the fuel feeding device 2.

The gasification medium is introduced to the bottom of shaft 3 through a gasification medium supply pipe 6, and the produced gas is carried off by a gas outlet 7 at the top of the shaft. In the shaft 3, the fuel travels from top to bottom in countercurrent to the ascending gases, through the pre-heating and drying zone 8, the devolatilization or distillation zone 9 and the gasification zone 10.

To prevent the caking together of the coal, softening in the gasification zone 10, to a cake of coke fouling the gas stream, a stirring device 11 is provided in the gasification zone 10. At the bottom of shaft 3, a rotating grate 12 is provided. From a moistening agent container 13, a moistening agent is pumped up by an injection pump 14 through a moistening agent supply line 17 into the shaft 3 and there so mixed with the coal by a moistening agent distributor 15, inside the rotating fuel distributor 4, that all coal pieces are coated with a film of moistening agent. The moistened coal forms in the pre-heating and drying zone 8, and in the uppermost part of the devolatilization zone 9, a filter layer 16, in which the dust entrained by the ascending gas stream, is separated and retained.

I claim:

1. A method for reducing the entrainment of fine dust particles in the gas stream of a shaft gas producer in which the gas stream flows upwardly and countercurrently to a downwardly moving bed of solid lumpy fuel which comprises maintaining in the shaft gas producer, above the gasification zone, a continuous dust filtering layer consisting of pieces of said solid fuel substantially coated with a moistening agent comprising hydrocarbon-containing compounds, the said filtering layer extending entirely across the cross-section of the shaft and to a depth wherein the ambient temperature does not exceed the initial boiling point of the said moistening agent.

2. The method of claim 1 in which the amount of moistening agent is added to the fuel in a quantity which increases with an increase in the output of the gas producer.

3. The method of claim 1 in which the amount of moistening agent is increased from about five percent by weight of the weight of fuel to ten percent by weight of the weight of fuel as the output of the gas producer is raised by fifty percent.

4. A method for reducing the entrainment of fine dust particles in the gas stream of a shaft gas producer in which the gas stream flows upwardly and countercurrently to a downwardly moving bed of solid lumpy fuel which comprises maintaining in the shaft gas producer, above the gasification zone, a continuous dust filtering layer consisting of pieces of said solid fuel substantially coated with a moistening agent comprising hydrocarbon-containing compounds, the said filtering layer extending entirely across the cross-section of the shaft, and to a depth wherein the ambient temperature does not exceed the initial boiling point of the said moistening agent, and recovering from the evolved gaseous products substantially free of coal dust, the hydrocarbon moistening agent contained therein.

5. A method for reducing the entrainment of fine dust particles in the gas stream of a shaft gas producer in which the gas stream flows upwardly and countercurrently to a downwardly moving bed of solid lumpy fuel which comprises maintaining in the shaft gas producer, above the gasification zone, a continuous dust filtering layer consisting of pieces of said solid fuel substantially coated with a moistening agent comprising hydrocarbon-containing compounds and having suspended therein a gasification catalyst, the said filtering layer extending entirely across the cross-section of the shaft and to a depth wherein the ambient temperature does not exceed the initial boiling point of the said moistening agent.

References Cited in the file of this patent

UNITED STATES PATENTS

| | | |
|---|---|---|
| 62,823 | Crutchett | Mar. 12, 1867 |
| 1,055,334 | Laird | Mar. 11, 1913 |
| 1,495,776 | Burdick | May 27, 1924 |
| 2,038,657 | Hillhouse | Apr. 28, 1936 |
| 2,126,150 | Stryker | Aug. 9, 1938 |
| 2,151,849 | Hardy et al. | Mar. 28, 1939 |
| 2,519,340 | Bailey | Aug. 22, 1950 |
| 2,572,061 | Sellers | Oct. 23, 1951 |
| 2,618,589 | Nicholson et al. | Nov. 18, 1952 |
| 2,639,982 | Kalbach | May 26, 1953 |
| 2,657,124 | Gaucher | Oct. 27, 1953 |